Oct. 16, 1962  E. A. SACK  3,059,147
ELECTROLUMINESCENT SWITCHING CIRCUIT
Filed Dec. 18, 1959

WITNESSES:
Bernard R. Gieguey
James F. Young

INVENTOR
Edgar A. Sack
BY
ATTORNEY 3,059,147
ELECTROLUMINESCENT SWITCHING CIRCUIT
Edgar A. Sack, Penn Hills Township, Allegheny County,
Pa., assignor to Westinghouse Electric Corporation,
East Pittsburgh, Pa., a corporation of Pennsylvania
Filed Dec. 18, 1959, Ser. No. 860,570
2 Claims. (Cl. 315—173)

The present invention relates to electroluminescent circuits and more particularly to a switching circuit for an electroluminescent cell or capacitor.

An object of the invention is to provide a switching circuit for an electroluminescent cell.

Another object of the invention is to provide a switching circuit which will effect illumination of an electroluminescent cell in a minimum of time after trigger excitation is applied.

Still another object of the invention is the provision of a triggering or switching circuit for an electroluminescent cell which will illuminate the electroluminescent cell and hold the cell illuminated in response to a single relatively short pulse.

A still further object of the invention is to provide a switching circuit for an electroluminescent cell which can be illuminated and maintained illuminated in response to a relatively short electrical signal and subsequently dimmed in response to another electrical signal.

The invention itself as well as additional objects and advantages thereof, will best be understood from the following description when read in connection with the accompanying drawing, in which.

Figure 1:
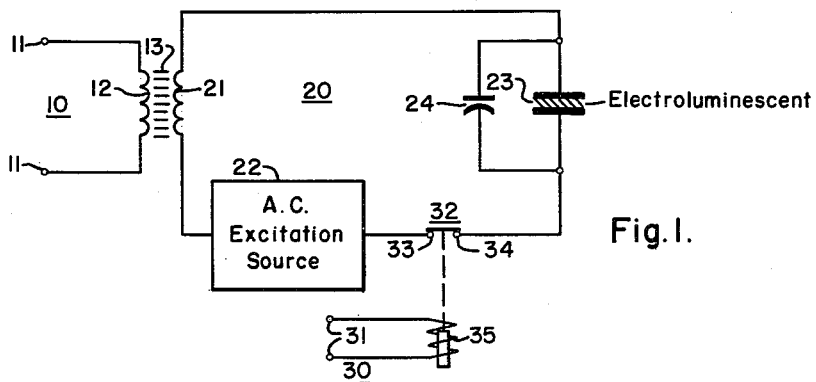
FIGURE 1 is a schematic circuit diagram of one embodiment of the invention.

The embodiment of the invention illustrated in FIG. 1 comprises generally a trigger input circuit 10 which applies a signal to a series resonant circuit 20 which includes an electroluminescent cell 23. When a pulse is applied to the input circuit 10, the series resonant circuit 20 is actuated to change from one stable state to another stable state and to thereby illuminate or activate the electroluminescent cell 23. Connected to the series resonant circuit 20 is an erase circuit 30 which operates to open the series resonant circuit 20. When a momentary pulse is applied to the erase circuit 30, the series resonant circuit 20 is opened and the circuit 20 is returned to its original state so as to substantially decrease the current passing through the electroluminescent cell 23 and thereby reduce the brightness of the electroluminescent cell 23 to a minimum.

More specifically, the trigger circuit 10 comprises a pair of input terminals 11 which are connected in series with a coil 12. The series resonant circuit 20 includes, connected in series electrical relationship, an inductance member 21, an alternating current excitation source 22, and an electroluminescent cell 23. A capacitor 24 is connected across the electroluminescent cell 23 to achieve a higher "Q" circuit and additionally reduce the inductance required in the core 13. As can be understood under certain circumstances capacitor 24 would be connected in series with cell 23. The inductance members 12 and 21 are wound about a saturable core 13 so that when a trigger pulse is applied to the input terminals 11, the inductor member 21 will be driven toward the region of saturation.

The inductor member 21, the capacitor 24 and the electroluminescent cell 23 and the excitation source 22, are connected in series with relay contacts 33 and 34 which are normally closed. These relay contacts form a part of a relay 32 including the relay contacts 33 and 34 and winding 35. The relay 32 is part of an erase circuit 30 having input terminals 31 to apply a signal to the winding 35 and open the contacts 33 and 34 which are normally closed.

The operation of the series resonant circuit 20, the theory and operation thereof is described in more detail in "Theory and Application of Mathien Functions" N. W. McLachlan, Oxford University Press, London, England, 1947. The resonant circuit 20 includes the alternating current excitation source 22 which generates an alternating current voltage at a predetermined fixed frequency. The reactances of the inductor member 21, the capacitor 24 and the electroluminescent cell 23 are chosen so that when the core 13 is operating largely in the saturation region the effective natural frequency of the circuit will be substantially the same as the frequency of the excitation source 22. When, however, the core 13 is operating largely in the unsaturated region the inductance of winding 21 will be higher and therefore the effective natural frequency of the circuit 20 will be substantially lower than the frequency of the excitation source 22. The two states at which the circuit 20 is stable, that is when the inductor member is unsaturated and when it is saturated, can be referred to as the "low" or the "high" state of the resonant circuit 20. When the circuit attains either the low or the high state, it will remain in this state until there is a sufficient change in the circuit to return the circuit to the other state. For this reason, the series resonant circuit 20 is a bistable circuit with the "low" state having a relatively low current through the electroluminescent cell 23 and the high state characterized by relatively high current passing through the electroluminescent cell 23.

Without any signal being applied to the input terminals 11, the core 13 remains largely unsaturated. The effective natural frequency of the circuit 20 will hence be substantially lower than the frequency of the excitation source 22 so that there will be only a minimum of current passing through the electroluminescent cell 23 and no illumination will be visible from the cell 23. When a pulse of sufficient area is applied to the input terminals 11, the saturable core 13 will be momentarily driven toward saturation so as to reduce the reactance of the winding 21 and thereby raise the effective natural frequency of the circuit 20 so that it will be approximately equal to the frequency of the excitation source 22. When this occurs there will be a maximum of current through the resonant circuit 20 so that a maximum current will pass through the electroluminescent cell 23 so as to illuminate the cell 23. Also, since the current is now much larger, the core 13 remains in saturation during a greater portion of each period and hence holds the circuit in the "high" stable state.

The relay 32 is employed to erase the electroluminescent cell 23 by bringing the current through the cell 23 to a minimum so as to sharply reduce the brightness light output of the cell 23. Hence, when the relay 32 is actuated under these conditions, the resonant circuit 20 will move from the so-called "high state" to the "low state."

The contacts 33 and 34 of the relay 32 are in series with the excitation source 22, inductance member 21 and the electroluminescent cell 23. The erase circuit 30 comprises input terminals 31 which are connected in series with a solenoid 35. The contacts 33 and 34 are normally closed and when an input pulse is applied to the input terminals 31 and the solenoid 35 is actuated to thereby open the contacts 33 and 34 so as to open the series resonant circuit 20. When this occurs the core 13 returns to the state of unsaturation so that the effective natural frequency of the circuit 20 is then lowered substantially below the fixed frequency of the excitation source 22 and hence the circuit 20 will return to the low state. The cell 23 is erased by lowering the current in the circuit 20 when contacts 33 and 34 are opened.

Figure 2:
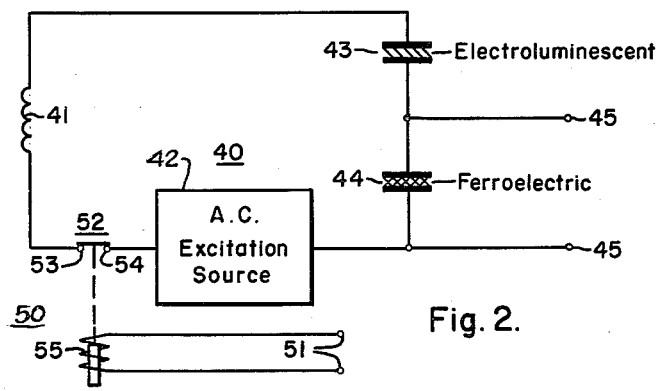
FIG. 2 is a schematic circuit diagram of another embodiment of the invention.

Another embodiment of the invention is illustrated in FIG. 2 and includes a series resonant circuit 40, an inductor member 41, a fixed frequency alternating current excitation source 42, an electroluminescent cell 43 and a nonlinear capacitor 44.

Figure 3:
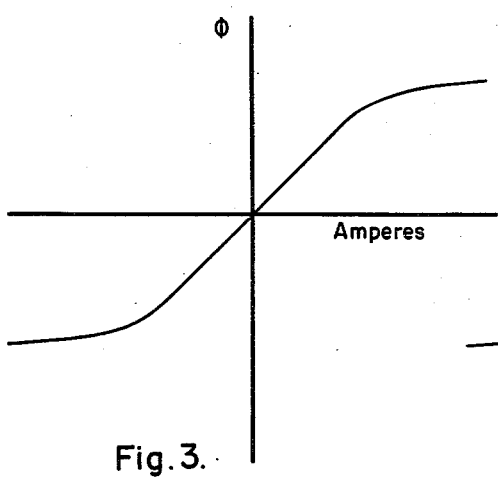
FIG. 3 illustrates a graph useful in explaining the invention.
Figure 4:
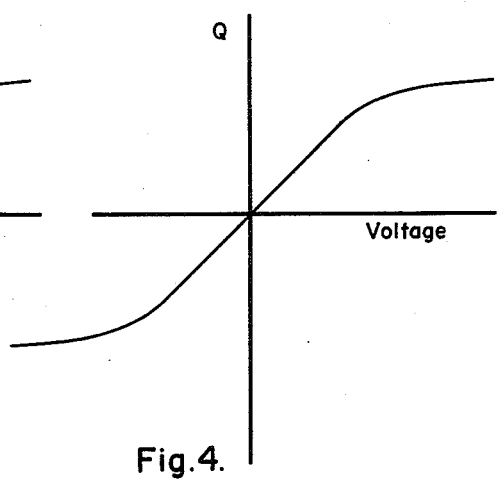
FIG. 4 illustrates a graph useful in explaining the invention.

A nonlinear capacitor for the purposes of this application, is hereby defined as a capacitor for which the time varying component of electric charge is dependent upon the average value of an applied periodic electric voltage. An example of nonlinear capacitor is one which uses nonlinear dielectric materials. Materials which may be termed linear dielectric materials, by reason of not coming within the preceding definition, are therefore those wherein the varying component of electric displacement is independent of the average value of the applied time varying electric field. The significance of this distinction between nonlinear and linear dielectric materials will become apparent in the discussion of the operation of a device in accordance with the present invention. The nonlinear dielectric material may be for example selected from the group of materials known as ferroelectric materials, particularly those of the barium titanate type. This class includes for example, barium titanate, barium-strontium titanate, barium-stannate, sodium columbate, sodium tantalate, potassium columbate, and potassium tantalate. The preparation of such material into a ceramic sheet is discussed in an article in "Bulletin of the American Ceramic Society" for May 1954, page 131 by Callahan and Murray. Preferably the inductor 13 and the capacitor 44 have characteristic curves as illustrated in FIGS. 3 and 4, respectively. As such, these elements have lower losses than "square loop" type elements resulting in a higher "Q" and better separation between the high and low states. As in circuit 20, a linear capacitor could be connected in parallel or in series with the electroluminescent cell 43 to achieve the optimum "Q" in the circuit and the desired natural frequency. Input terminals 45 are connected to either side of the nonlinear capacitor 44. When the nonlinear capacitor 44 is largely unsaturated, the resonant circuit 40 has an effective natural frequency substantially lower than the frequency of the excitation source 42. Consequently, the resonant circuit will be in a "low state" with a minimum of current passing through the circuit and a minimum of current passing through the electroluminescent cell 43. When a pulse of sufficient amplitude is applied across the terminals 45, the nonlinear capacitor 44 will be momentarily saturated so as to raise the effective natural frequency of the circuit 40 to be substantially equal to the fixed frequency of the excitation source 42. When the pulse is removed from the terminals 45, the increased current will cause the non- linear capacitor to remain saturated during a larger portion of each cycle so that the circuit will remain in the high state due to this self-saturating characteristic. In the "high" state the current through the resonant circuit 40 will be large so as to sharply increase the brightness of the electroluminescent cell 43 similar as was described in the embodiment shown in FIG. 1.

An erase circuit 50 is provided to return the resonant circuit 40 from the high state to the low state so as to sharply reduce the brightness light output of the cell 43. The erase circuit 50 includes a relay 52 having contacts 53 and 54 in series with the other elements of the resonant circuit 40. Input terminals 51 are provided in series with the solenoid 55. The relay 52 is normally closed so that when a pulse of sufficient amplitude is supplied to the input terminals 51 the contacts 53 and 54 will be opened a sufficient time so that the ferroelectric capacitor 44 will return to a state of unsaturation so as to substantially lower the resonant frequency of the series resonant circuit 40 and thereby sharply reduce the brightness light output of the cell 43.

While the present invention has been described with reference to particular embodiments thereof, it will be understood that numerous modifications may be made by those skilled in the art without actually departing from the invention.

I claim as my invention:

1. An electroluminescent device comprising a bistable series resonant circuit including an electroluminescent capacitor, a nonlinear inductance member and a source of fixed frequency alternating current voltage, means for selectively applying a signal to said inductance member to vary the reactance thereof and change the effective resonant frequency of said circuit to a second frequency, and means responsive to another signal to open said circuit and change the effective resonant frequency of said circuit from said second frequency to said first frequency.

2. An electroluminescent device comprising a bistable series resonant circuit including an electroluminescent capacitor, a nonlinear capacitor member an inductive member and a source of fixed frequency alternating current voltage, the reactance of said circuit effective to resonate at a first frequency, means for selectively applying a signal to said nonlinear capacitor member to change the reactance thereof and thereby vary the effective resonant frequency of said circuit to a second frequency, and means responsive to another signal for opening said circuit in changing the effective resonant frequency of said circuit from said circuit frequency to said first frequency.

References Cited in the file of this patent

UNITED STATES PATENTS

| | | |
|---|---|---|
| 2,653,254 | Spitzer et al. | Sept. 22, 1953 |
| 2,859,385 | Bentley | Nov. 4, 1958 |
| 2,875,380 | Toulon | Feb. 24, 1959 |
| 2,888,593 | Anderson et al. | May 26, 1959 |

OTHER REFERENCES

Briggs: R.C.A. TN No. 111, April 1, 1958.